(12) United States Patent
Fosseide et al.

(10) Patent No.: US 8,467,614 B2
(45) Date of Patent: Jun. 18, 2013

(54) METHOD FOR PROCESSING OPTICAL CHARACTER RECOGNITION (OCR) DATA, WHEREIN THE OUTPUT COMPRISES VISUALLY IMPAIRED CHARACTER IMAGES

(75) Inventors: Knut Tharald Fosseide, Kolbotn (NO); Hans Christian Meyer, Oslo (NO)

(73) Assignee: Lumex AS, Oslo (NO)

( * ) Notice: Subject to any disclaimer, the term of this patent is extended or adjusted under 35 U.S.C. 154(b) by 385 days.

(21) Appl. No.: 12/744,974

(22) PCT Filed: Nov. 21, 2008

(86) PCT No.: PCT/NO2008/000419
§ 371 (c)(1),
(2), (4) Date: Jul. 7, 2010

(87) PCT Pub. No.: WO2009/070032
PCT Pub. Date: Jun. 4, 2009

(65) Prior Publication Data
US 2010/0303356 A1    Dec. 2, 2010

(30) Foreign Application Priority Data
Nov. 28, 2007  (NO) ................................. 20076153

(51) Int. Cl.
*G06K 9/62* (2006.01)

(52) U.S. Cl.
USPC ........... 382/209; 382/170; 382/171; 382/172; 382/176; 382/177; 382/278; 382/181; 382/187; 382/290; 382/321; 382/291; 382/292

(58) Field of Classification Search
USPC ......... 382/294, 321, 170–172, 209, 176–177, 382/181, 187, 278, 290–292
See application file for complete search history.

(56) References Cited

U.S. PATENT DOCUMENTS

| | | | | | |
|---|---|---|---|---|---|
| 5,745,600 | A | * | 4/1998 | Chen et al. | 382/218 |
| 5,751,850 | A | * | 5/1998 | Rindtorff | 382/178 |
| 5,889,885 | A | * | 3/1999 | Moed et al. | 382/172 |
| 5,963,666 | A | * | 10/1999 | Fujisaki et al. | 382/187 |
| 6,507,670 | B1 | * | 1/2003 | Moed | 382/172 |

(Continued)

FOREIGN PATENT DOCUMENTS

| | | | |
|---|---|---|---|
| RU | 2234126 C2 | * | 8/2004 |
| RU | 2234126 | | 10/2004 |

OTHER PUBLICATIONS

Morphological—Restoration., Zheng et al., IEEE, 0-7803-6725-1, 2001, pp. 193-196.*

(Continued)

*Primary Examiner* — Jayesh A Patel
(74) *Attorney, Agent, or Firm* — Pearl Cohen Zedek Latzer, LLP

(57) ABSTRACT

The present invention provides a method for an Optical Character Recognition (OCR) system providing recognition of characters that are partly hidden by crossing outs due to for example an imprint of a stamp, handwritten signatures, etc. The method establishes a set of template images of certainly recognized characters from the image of the text being processed by the OCR system, wherein the effect of the crossed out section is modelled into the template images before comparing these images with the image of a visually impaired crossed out character. The modelled template image having the highest similarity with the visually impaired crossed out character is the correct identification for the visually impaired character instance.

8 Claims, 4 Drawing Sheets

U.S. PATENT DOCUMENTS

| | | | |
|---|---|---|---|
| 6,690,824 B1 | 2/2004 | Stringa | |
| 2002/0131642 A1* | 9/2002 | Lee et al. | 382/220 |
| 2003/0043172 A1* | 3/2003 | Li et al. | 345/636 |
| 2004/0047508 A1 | 3/2004 | Anisimovich et al. | |
| 2006/0056696 A1* | 3/2006 | Jun et al. | 382/185 |
| 2008/0063279 A1* | 3/2008 | Vincent et al. | 382/182 |
| 2008/0069447 A1* | 3/2008 | Hotta et al. | 382/182 |

OTHER PUBLICATIONS

Morphological—Restoration., Zheng et al., IEEE, 0-7803-6725-1,2001, pp. 193-196.*

Translation of Decision to Grant for related Russian Application No. 2010125821.

Qigong Zheng et al., "Morphological degradation models and their use in document image restoration," Image Processing, 2001. Proceedings. 2001 International Conference on, vol. 1, Oct. 7-10, 2001; pp. 193-196; ISBN 0-7803-6725-1.

International Search Report, issued Mar. 4, 2009, for International Application No. PCT/NO2008/000419.

Written Opinion, issued Mar. 4, 2009, for International Application No. PCT/NO2008/000419.

* cited by examiner

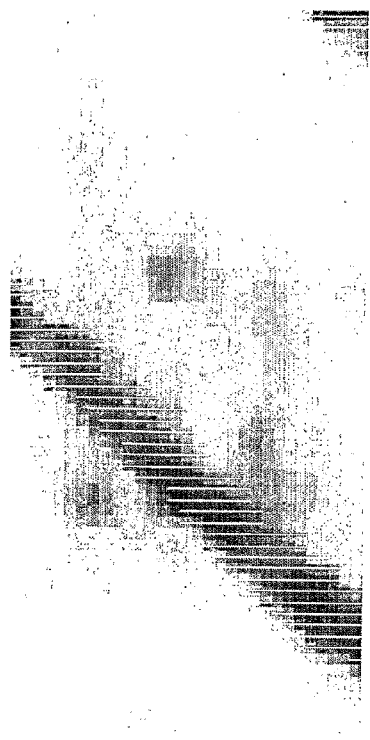
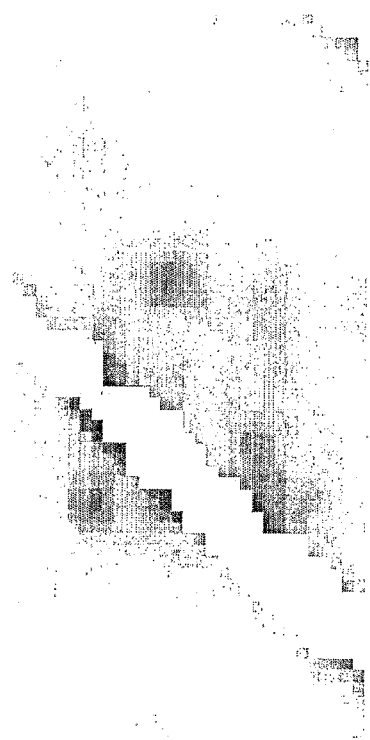
Fig. 2aFig. 2b

METHOD FOR PROCESSING OPTICAL CHARACTER RECOGNITION (OCR) DATA, WHEREIN THE OUTPUT COMPRISES VISUALLY IMPAIRED CHARACTER IMAGES

CROSS-REFERENCE TO RELATED APPLICATIONS

This application is National Phase Application of PCT International Application No. PCT/NO2008/000419, International Filing Date Nov. 21, 2008, claiming priority of Norwegian Patent Application NO 20076153, filed Nov. 28, 2007, which are hereby incorporated by reference in their entirety.

FIELD OF THE INVENTION

The present invention is related to a method for resolving contradicting output data from an Optical Character Recognition (OCR) system, and especially to a method for processing OCR output data, wherein the output data comprises unrecognizable character images due to crossed out text or other types of overlaid objects impairing the optical recognition process of the OCR system

BACKGROUND OF THE INVENTION

Optical character recognition systems provide a transformation of pixelized images of documents into ASCII coded text which facilitates searching, substitution, reformatting of documents etc. in a computer system. One aspect of OCR functionality is to convert handwritten and typewriter typed documents, books, medical journals, etc. into for example Internet or Intranet searchable documents. Generally, the quality of information retrieval and document searching is considerably enhanced if all documents are electronically retrievable and searchable. For example, a company Intranet system can link together all old and new documents of an enterprise through extensive use of OCR functionality implemented as a part of the Intranet (or as part of the Internet if the documents are of public interest).

However, the quality of the OCR functionality is limited due to the fact that the complexity of an OCR system in itself is a challenge. It is difficult to provide an OCR functionality that can solve any problem encountered when trying to convert images of text into computer coded text. One such problem is due to crossed out text that often may be encountered in documents. For example, a stamp with the text "COPY" may be applied onto a page of a document to signify that this document is not the original document, but a copy of the original document. Sometimes such documents have to be certified as a correct copy of the original document, which is typically done with additional stamps and a signature of a person entrusted to certify such copies, for example.

The common effect of the crossed out text or other objects overlaying characters is that characters in words will be hidden by the objects provided by for example the stamp or the handwritten signature, as described above, making a correct identification of the characters and the words comprising the characters difficult for an OCR system. Usually, OCR systems provide output data comprising a list of uncertainly recognized characters. Such crossed out characters etc. will therefore be identifiable as such, and their position on a text page, in words etc., possible alternative interpretations of the hidden or partly hidden character etc. may be reported by the OCR system.

SUMMARY OF THE INVENTION

According to an aspect of the present invention, such overlaid objects may be identified, as such in it self, but also the location and extent of the overlaid object across an image of a character in a text may be identified. When the overlaid objects are identified, the visually impaired parts of the character image is discarded from the image representing the character. The remains of the visually impaired character images are then compared with images from a set of template character images according to the present invention. This comparison will then make it possible to identify at least one template image having a highest similarity with the image comprising the remains of the visually impaired character image. If this process returns only one candidate template image having a similarity above a preset threshold level, the problem would have been solved. However, usually there are a multiple of candidate characters that provides a high degree of similarity between the remains of a visually impaired character image and the candidate template images. Therefore, the problem is to select the correct candidate character image amongst a plurality of candidate template images as the correct identification of the visually impaired character.

According to an example of embodiment of the present invention, the information related to location and extent of the overlaid objects of a character is used to model an overlaid object at a same location and extent in template images before comparing the visually impaired character instance with the template images modelled with the actual overlaid object. For example, correlations between the remaining parts of images of the respective visually impaired character instance and possible candidate template images provides a method for identifying which template character image that actually represents the visually impaired character instance, and thereby the correct recognition of the visually impaired character instance.

According to another aspect of the present invention, the possibility to select the correct candidate character image amongst a plurality of candidate characters as the correct identification of the visually impaired character is significantly improved when a set of template character images is provided for by using images of characters from the document itself identified by the OCR system as being characters identified with a certainty above a predefined threshold level. Such character images comprises details of the character images as encountered in the document itself, and not as modelled character images as known in prior art for character template matching. When the overlaid objects of the visually impaired character instance are modelled into these template images, the robustness of the correlation is enhanced considerably.

BRIEF DESCRIPTION OF THE DRAWINGS

FIG. 2a illustrates a visually impaired character instance of a character 'a' partly being overlaid by the P in FIG. 1.

FIG. 2b illustrates removal of the visually impaired section in FIG. 2b according to the present invention.

DETAILED DESCRIPTION OF THE INVENTION

Figure 1:
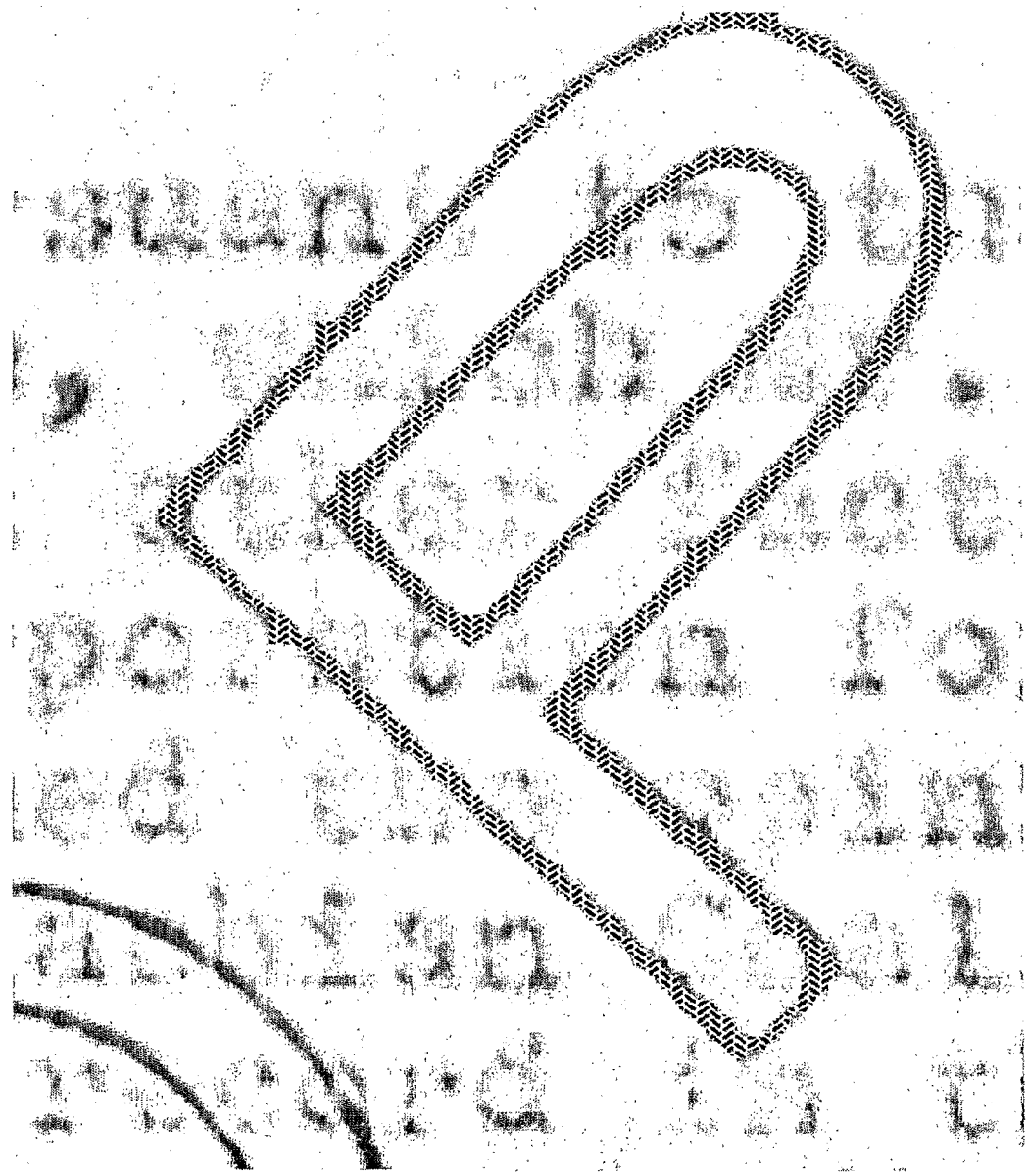
FIG. 1 illustrates an example of the stamped letter P visually impairing a part of a text page. The character P is from a stamp comprising the text "COPY".

According to an aspect of the present invention, the presence of an overlaid object, for example due to a stamp or handwritten signature, etc. may be identified by analyzing connected pixels in images comprising text rich regions in a document. Alternatively, or in addition, the output data from an OCR system may comprise identifications of uncertainly recognized characters, their positions on a page etc. providing a hint about where such problems may be present. For example, a hint of such a problem can be identified by the fact that where a text line is crossed out there will be at least one character that cannot be recognized, and other characters of the same poor quality will be unrecognizable in a text line above or under the current text line. A further investigation of pixel content in the space between the text lines would then provide a certain indication of crossed out characters, for example, since these spaces should normally be empty. For example, edge tracking of the imprint providing the overlaid object or centreline tracking of the imprint providing the overlaid object would provide a confirmation that there is crossed out text present in the document. Other methods could use a model of known imprints from stamps that may have been used on the document pages. By rotating a modelled image of the stamp, an identification of the imprint on the page could be done. Other indicators for the presence of the crossed out text could be the text size compared to the extent of the overlaid object. Additional methods could provide a confirmation of the crossed out text by following a shortest distance between visually impaired character images on one text line above another text line. If there are imprints (pixels that are "on") along this shortest line it is probable from an overlaid object on the page, for example a stamp. It is also possible to use morphological operators to identify long lines across a text page. However, it is within the scope of the present invention to be able to use any method providing an identification of crossed out characters in an image of text.

The identification of crossed out text will then trigger a search for the actual images of characters comprising crossed out regions. These characters will be identified as unrecognizable characters or as uncertainly recognized characters by the OCR system. For example, by comparing such reported characters and their position in the image of the text with information obtained when identifying the presence of the overlaying imprint, these characters are identified. Such character images are then being identified by providing a bounding box around the respective characters in the text. These character instances will then comprise three types of possible crossed out character images: one type comprising a completely crossed out image, and a second type comprising a partly crossed out character image, wherein the crossed out section covers parts of the body of the character. The third possible scenario is that the crossed out section in the bounding box do not cross or touch the body of the character itself, but passes the bounding box without covering any part of the body of the character. However, in this situation it is most likely that the OCR system is incapable to identify correctly the character since the extra "on" pixels will probably degrade the recognition algorithm used by the OCR system. The characters being completely crossed out can be identified by using the words they are part of for their certain identification. However, a word comprising a missing character (or completely unrecognizable character) would provide a list of possible candidate words. It is also a possibility that the overlaid object masks several characters in the words. The resolve of such contradicting words represent another type of invention which is outside the scope of the present invention. However, whenever a crossed out character has been identified, it is within the scope of the present invention to control the identification, for example by using a dictionary look up. If the dictionary returns a word, it is a possible verification of the character in question.

Therefore, the present invention will provide certain recognition of partial crossed out character images (the type two and three referenced above). One aspect of the present invention is to be able to reference parts or locations of regions in images across different images of characters. As known to a person skilled in the art, a common reference system may be established by using for example a corner of a text page as a referencing point, and then using ordered pairs of numbers to reference individual pixels, cluster of pixels, connected pixels etc. However, this would require a huge effort converting coordinates when comparing information located at different locations on a text page. The location or region information about differentiating aspects of character images and/or uncertainly recognized characters can be referenced consistent throughout all the images of the individual respective images of the characters when the images are aligned with respect to each other such that as much as possible of the character bodies themselves are positioned on top of each other when the images are viewed as being placed on top of each other. To achieve this alignment, displacements between the different images can be calculated, for example by correlating combinations of images. According to an example of embodiment of the present invention, the bonding boxes used to separate the crossed out characters from the text page can be correlated with template images of characters thereby providing a displacement used for an alignment of the images according to the present invention. The alignment provided by calculating maximum correlation and the corresponding placement between images makes it possible to identify the regions of visually impaired character instances in an image of a text page that are actually crossed out relative to the character body itself. When the region is identified, the same region comprising the crossed out parts can be introduced at the same location relative to the character body itself in template images of characters. This provides then a possibility to examine what is left of the template images, and compare the content of these regions with the regions of the visually impaired character instance comprising the visually impaired sections. A search for maximum correlation provides a measurement of which template image that comprises regions outside the visually impaired sections that is most equal the same regions in the visually impaired character instance comprising the overlaid object. The template image having the maximum correlation value is the correct selection as an identification of the visually impaired crossed out character instance.

FIG. 1 illustrates a situation wherein a letter P from the word "COPY" that has been stamped across a section of a page. In an example of embodiment of the present invention, the crosses out character 'a' indicated by the arrow in FIG. 1 will be used to illustrate examples aspects of the present invention.

FIG. 2*a* illustrates the character 'a' provided with a bounding box separating the character 'a' image comprising the visually impaired section out from the rest of the image comprising the text. FIG. 2*b* illustrates the situation wherein the region comprising the visually impaired section has been "blanked out", by for example setting all grey level pixel values to the background colour (i.e. white). According to an aspect of the present invention, comparing the image when the crossed out section is "blanked out" simplifies the comparison with other character images. The image in FIG. 2b is then used when comparing the image with other template images.

When it is identified that an imprint, for example from a stamp, is present and is visually impairing the text, information about the points where the imprint crosses text lines can be used to identify the entry and exit points of the imprint in the bonding box of the visually impaired character instance, since the visually impaired character instance is actually fetched from the position on the page wherein the imprint actually is present. However, any method providing an identification of the regions comprising the overlaid object is within the scope of the present invention. The size of the imprint can be used to determine if the visually impaired character image is of type one as detailed above, for example. If the type is the type one, the process is terminated, the other two types of overlaid objects are processed the same way according to the present invention.

Figures 3A, 3B:
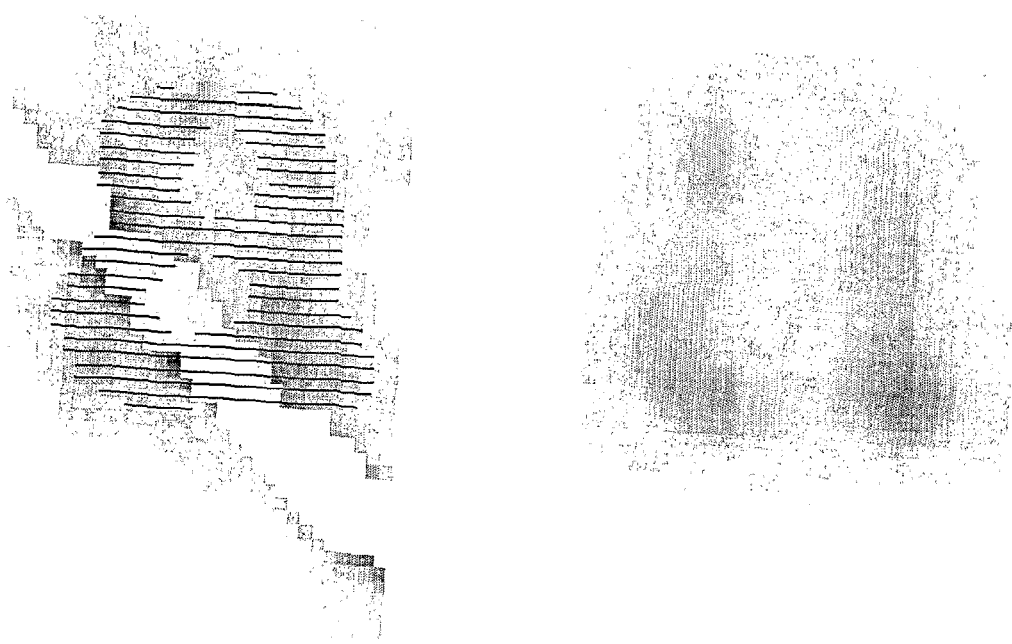
FIG. 3a illustrates an example of maximum correlation between the image in FIG. 2b and a template for the character 'a', as depicted in FIG. 3b.

According to an example of embodiment of the present invention, the image in FIG. 2b is correlated with template images created from images of characters having an image quality above a predefined threshold value. FIG. 3a illustrates how the correlation identified by correlating the image in FIG. 2b with the template image in FIG. 3b provides an alignment between the visually impaired image of the character 'a' inside the chosen bonding box, and how it is possible to identify which regions belongs to the character itself, and which regions belongs to the crossed out regions.

According to yet another example of embodiment of the present invention, character body sizes of template images are compared with the size of the extent of the overlaid object in the visually impaired character instance. If the size of the character body of a template image (scaled to the font size of the document) is below the size of the extent of the visually impaired section, these template images are discarded from further use when searching for the correct identification of the visually impaired character instance, since these template image bodies would be completely hidden by for example the imprint visually impairing the character images. In this manner, the number of comparisons can be limited.

Figures 4A, 4B:
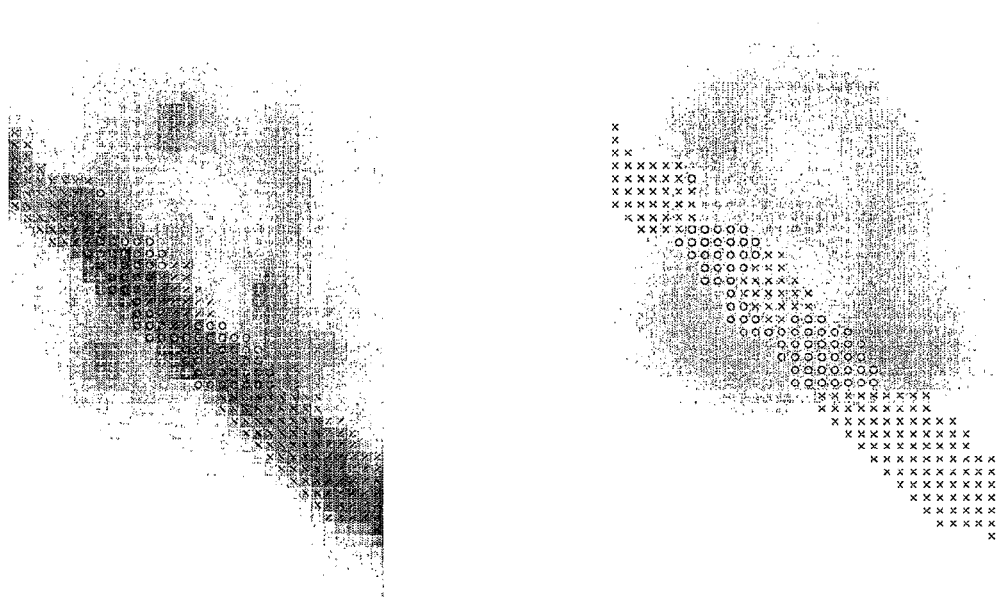
FIG. 4a illustrates different categories of pixels in the visually impaired character instance in FIG. 2a, according to the present invention.
FIG. 4*b* illustrates corresponding categories of pixels in a crossed out template according to the present invention.

FIG. 4a and FIG. 4b illustrates how pixels in the images representing the template, the visually impaired instance and the crossed out sections can be classified as belonging to one of four different classifications. This classification is best achieved by thresholding the template image providing a highest correlation with the visually impaired template instance comprising the crossed out section, then introducing the identified crossed out section into this template image. Since the correlation between the images provides the displacement or offset between the images, these classifications can be identified in all the images as represented in FIGS. 4a and 4b, respectively, and can be visualized by letting:

1. 'On' pixels not touched by the crossed out section be illustrated as white '+'.
2. 'On' pixels touched by the crossed out section be illustrated as black 'o'.
3. 'Off' pixels not touched by the crossed out section be illustrated as none.
4. 'Off' pixels touched by the crossed out section be illustrates as black 'x'.

There are several methods for investigating which template image that has a maximum similarity when compared with the visually impaired character image. For example by correlation of images after alignment of the respective images. According to another example of embodiment of the present invention, the only interesting pixels to investigate are the 'on' pixels as identified above in the classification of pixels comprised in the images being processed in the OCR system. Then it is possible to calculate a measure of parallelism between the 'on' pixels in the visually impaired character instance and the template image. An example of such parallelism is:

$$\psi = \frac{\sum_{k=1}^{n} p_k p'_k}{\sqrt{\sum_{k=1}^{n} p_k^2 \cdot \sum_{k=1}^{n} p'^2_k}}$$

wherein $p_k$ are the offset untouched 'on' pixels in the visually impaired character instance and $p'_k$ the untouched 'on'-pixels in the template image. The parallelism for the 'a' template example from FIG. 1 is 0.971 which is the highest of all templates identified in this document, and a correct classification is achieved.

According to an aspect of the present invention, the method steps described above is best achieved when the template images are images of characters as they actually appears in the document being processed by the OCR system. The template images can be identified as character images of a quality above a predefined level and/or as a super positioning of several images on top of each other representing the same character image, denoted as a character class.

According to an example of embodiment of the present invention, the following steps can be performed when creating character classes:

I. choosing randomly three samples in a class, correlating all the combinations of these three samples, and then selecting the pair of correlated images providing a correlation above a predefined threshold level as a starting point for a template for this character class, II. if none of the combinations of pairs selected in I provides a correlation above the threshold level, select other samples in the class until a pair is obtained with a correlation above the predefined threshold level, III. if none of the pair of samples in II is found to have a correlation above the predefined threshold level, discard this class from further use, IV. for the initial pair identified in I or II, correlate the images of the pair identifying a displacement between them before generating an aligned accumulated template image of the images that are used as a starting template image for the respective character class, V. for all the remaining samples in the class, correlate them with the accumulated template in IV to identify a displacement between them, and if the correlation is above the predefined threshold, align the images before adding the aligned images to the accumulated image in IV, VI. if some of the aligned images used in V comprise parts of the image that is outside the starting template in IV, expand the accumulated template after all samples have been used to be within a bounding box defined as the median size of the bounding boxes of a subset of images representing a majority of the images.

According to another example of embodiment of the present invention, the accumulation of aligned images into the template for a class representing a character, comprises further adding corresponding grey level pixel values from corresponding locations in the aligned images together such that each grey level pixel value is weighted with an inverse of the number of currently accumulated aligned images in the template image for the class before performing the addition.

In some instances, there will be missing character images in a template set or class according to the present invention. This would provide a situation wherein there is for example a missing template image. Such situations can occur for example if a character indeed is rarely used in the language of the document. For example, in Norwegian the character c is a rarely used character in contrast to other languages wherein c is the most common used character. A typical confusion alternative for the character c is the character e. It is reasonable to expect that there will be a template present for the character e, but probably not for the character c. When there is identified that a template is missing, a synthetic template image can be provided for on basis of an already existing template image that resembles the missing template image. In this way, some of the graphical attributes of characters as they are encountered in the document being processed by the OCR system will be part of the synthesized templates image.

In an example of embodiment according to the present invention, an occluded character is recognized through performing following method steps, for example embodied in a computer program in communication or linked to an OCR system in the computer system, or to another computer system via a network:

Assume that templates has been accumulated for the relevant template character classes and font, a bounding box for the occluted character/word is identified, and there is also identified a location measure of the clutter relative to the bounding box.

Step 1: set the clutter in the character image to a representative background level (black inverted to white, or vice versa for example), Step 2: correlate with accumulated templates, Step 3: threshold accumulated templates, for example by Canny thresholding, Step 4: for each template candidate:
 1. identify overlay of clutter contamination in the offset template.
 2. select the on-pixels in the template that is not touched by the contamination and use a consistency metric with these pixels and the pixels in the instances offset according to the maxima of the correlation for the consistency metric calculation,
 3. correlate the offset template image with the character image where the clutter (overlay) has been set to the background level in both images, use the common pixels in the character image and the offset template image for a normalization process,
 4. save the maximum metric value for the template,
 5. save the maximum correlation for the template.

The template with the maximum value is the most probable character for the occluded character, and thereby the occluded character is identified.

Embodiments

1. A method for resolving contradicting output data from an Optical Character Recognition (OCR) system, wherein the output data comprises at least one visually impaired character instance due to at least one overlaid object in a document being processed by the OCR system, the method comprises:
    a) searching through the output data identifying images of characters having an image quality above a predefined level, and using these character images as a set of template images for characters,
    b) identifying location and region of a visually impaired section of the at least one visually impaired character instance,
    c) using the information about the location and the region from the visually impaired character instance to locate corresponding regions in template images, before comparing the respective template images with the at least one visually impaired character instance disregarding image content in the respective located regions when comparing, and using the template image providing the highest similarity with the visually impaired character image as a correct identification of the visually impaired character instance.

2. The method according to embodiment 1, wherein grey level pixel values of pixels comprised in the located region of the obscuring section is set to a background level.

3. The method according to embodiment 1, wherein the image of the visually impaired character instance and respective template images are correlated to provide a displacement between the respective images, which is being used to align the images before comparing the respective images.

4. The method according to embodiment 1, wherein the image of the visually impaired character instance is correlated with each of the respective template images, and a list of template images providing a correlation above a predefined threshold level is listed as a set of template candidate images being possible correct identifications of the visually impaired character instance, and then using the respective template candidate images when comparing to obtain the correct identification of the visually impaired character instance.

5. The method according to embodiment 1, wherein the comparison of the image of the visually impaired character instance with respective template images is calculated as a consistency metric:

$$\psi = \frac{\sum_{k=1}^{n} p_k p'_k}{\sqrt{\sum_{k=1}^{n} p_k^2 \cdot \sum_{k=1}^{n} p'^2_k}}$$

wherein $p'_k$ are pixel values from the image of the at least one visually impaired character instance belonging to the visually impaired character instance body itself, and not the background of the image, $p_k$ is correspondingly located pixel values from a respective aligned image of a template image belonging to the template character body itself, and not the background of the image.

6. The method according to embodiment 1, wherein the step providing a template set comprises sorting all reported identified characters above the threshold level into classes, wherein each class represents the same identified character in the template set, and then performing the steps of providing images for each character or class in the template set by:
    I. choosing randomly three samples in a class, correlating all the combinations of these three samples, and then selecting the pair of correlated images providing a correlation above a predefined threshold level as a starting point for a template for this character class,
    II. if none of the combinations of pairs selected in I provides a correlation above the threshold level, select other samples in the class until a pair is obtained with a correlation above the predefined threshold level, III. if none of the pair of samples in II is found to have a correlation above the predefined threshold level, discard this class from further use, IV. for the initial pair identified in I or II, correlate the images of the pair identifying a displacement between them before generating an aligned accumulated template image of the images that are used as a starting template image for the respective character class, V. for all the remaining samples in the class, correlate them with the accumulated template in IV to identify a displacement between them, and if the correlation is above the predefined threshold, align the images before adding the aligned images to the accumulated image in IV, VI. if some of the aligned images used in V comprise parts of the image that is outside the starting template in IV, expand the accumulated template after all samples have been used.

7. The method according to embodiment 6, wherein the accumulation of aligned images into the template for a class representing a character, further comprises adding corresponding grey level pixel values from corresponding locations in the aligned images together such that each grey level pixel value is weighted with an inverse of the number of currently accumulated aligned images in the template image for the class before performing the addition.

8. The method according to embodiment 6, wherein a situation when a character class is missing due to missing identified character images from the document being processed in the OCR system, a missing template class is synthesized from another existing template class resembling the missing template class.

The invention claimed is:

1. A method for resolving contradicting output data from an Optical Character Recognition (OCR) system, wherein the output data comprises at least one visually impaired character instance due to at least one overlaid object in a document being processed by the OCR system, the method comprising:

a) searching through the output data identifying images of characters having an image quality above a predefined level, and using these character images as a set of template images for characters, b) identifying location and region of a visually impaired section of the at least one visually impaired character instance, c) using the information about the location and the region from the visually impaired character instance to locate corresponding regions in template images, before comparing the respective template images with the at least one visually impaired character instance disregarding image content in the respective located regions when comparing, and using the template image providing the highest similarity with the visually impaired character image as a correct identification of the visually impaired character instance.

2. The method according to claim 1, wherein grey level pixel values of pixels comprised in the located region of the obscuring section is set to a background level.

3. The method according to claim 1, wherein the image of the visually impaired character instance and respective template images are correlated to provide a displacement between the respective images, which is being used to align the images before comparing the respective images.

4. The method according to claim 1, wherein the image of the visually impaired character instance is correlated with each of the respective template images, and a list of template images providing a correlation above a predefined threshold level is listed as a set of template candidate images being possible correct identifications of the visually impaired character instance, and then using the respective template candidate images when comparing to obtain the correct identification of the visually impaired character instance.

5. The method according to claim 1, wherein the comparison of the image of the visually impaired character instance with respective template images is calculated as a consistency metric:

$$\psi = \frac{\sum_{k=1}^{n} p_k p'_k}{\sqrt{\sum_{k=1}^{n} p_k^2 \cdot \sum_{k=1}^{n} p'^2_k}}$$

wherein $p'_k$ are pixel values from the image of the at least one visually impaired character instance belonging to the visually impaired character instance body itself, and not the background of the image, $p_k$ is correspondingly located pixel values from a respective aligned image of a template image belonging to the template character body itself, and not the background of the image.

6. The method according to claim 1, wherein using the identified character images as a set of template images comprises sorting all reported identified characters above the predefined level into classes, wherein each class represents the same identified character in the template set, and then performing the steps of providing images for each character or class in the template set by:

I. choosing randomly three samples in a class, correlating all the combinations of these three samples, and then selecting the pair of correlated images providing a correlation above a predefined threshold level as a starting point o for a template for this character class, II. if none of the combinations of pairs selected in I provides a correlation above the predefined threshold level, select other samples in the class until a pair is obtained with a correlation above the predefined threshold level, III. if none of the pair of samples in II is found to have a correlation above the predefined threshold level, discard this class from further use, IV. for the initial pair identified in I or II, correlate the images of the pair identifying a displacement between them before generating an aligned accumulated template image of the images that are used as a starting template image for the respective character class, V. for all the remaining samples in the class, correlate them with the accumulated template in IV to identify a displacement between them, and if the correlation is above the predefined threshold, align the images before adding the aligned images to the accumulated image in IV, VI. if some of the aligned images used in V comprise parts of the image that is outside the starting template in IV, expand the accumulated template after all samples have been used.

7. The method according to claim 6, wherein the accumulation of aligned images into the template for a class representing a character, further comprises adding corresponding grey level pixel values from corresponding locations in the aligned images together such that each grey level pixel value is weighted with an inverse of the number of currently accumulated aligned images in the template image for the class before performing the addition.

8. The method according to claim 6, wherein a situation when a character class is missing due to missing identified character images from the document being processed in the OCR system, a missing template class is synthesized from another existing template class resembling the missing template class.

* * * * *